UNITED STATES PATENT OFFICE.

ANSIL MOFFATT, OF INDIANAPOLIS, INDIANA.

PROCESS OF FORMING STARCH INTO COHERENT MASSES.

SPECIFICATION forming part of Letters Patent No. 541,941, dated July 2, 1895.

Application filed October 18, 1894. Serial No. 526,294. (No specimens.)

*To all whom it may concern:*

Be it known that I, ANSIL MOFFATT, a citizen of the United States, residing at Indianapolis, in the county of Marion and State of Indiana, have invented certain new and useful Improvements in the Process of Forming Starch into Coherent Masses; and I do declare the following to be a full, clear, and exact description of the invention, such as will enable others skilled in the art to which it appertains to make and use the same, reference being had to the accompanying drawings, and to the letters of reference marked thereon, which form a part of this specification.

Heretofore in the manufacture of coherent masses of starch, from cereal grains, (from which I believe all "lump" starch has heretofore been made,) it has been customary to steep the grain, at suitable temperatures, then grind, passing the ground grain over sifting devices, whereby the starchy portion is sifted away, and the chaffy residue tailed off. The starchy water is then passed over flat floors, technically known as "runs," (sometimes after a preliminary treatment,) whereby the starch settles in a stiff magma on the floor of the "runs" and a second tailings, known as "gluten" or "stop," tails off. This starch, now nearly pure, but retaining about forty per cent. of water, is shaped into cubical forms, about seven inches cube, and after draining is placed in hot rooms, known as "crusting" rooms, remaining until a yellowish "crust" is formed on the surface, when it is removed and the "crust" scraped away. The interior piece of starch, now practically pure, and containing about twenty-five per cent. of water, is ready for making into the coherent masses, known as "lump" starch, which is done by breaking it into pieces of from one to four cubic inches volume, more or less, and placing in shallow trays in a dry-room, where gradual drying is allowed to take place, extending over from six to twenty days, according to different practices. When dry, this constitutes the "lump" starch of commerce, in contradistinction to rapidly dried starch, which does not dry in "lumps," but in small crystals. It has been proposed, also, to take the starch at an early stage and subject it to centrifugal action in order to avoid the necessity of "crushing," "scraping," &c., but as the starch leaves the centrifugal machine it still retains from twenty-five per cent. to thirty per cent. of water, and must be subjected to the usual long drying, in order to produce "lump" starch.

My process is not concerned with initial steps of manufacture, but in the way in which I prefer to operate it. I take starch from the "runs," dry rapidly until it possesses about twenty per cent. of water, and then subject it to the joint action of heat and pressure, whereby it is consolidated into compact masses or "lumps," without the necessity of "crushing," "scraping," or long subjection to heat in dry-rooms, as heretofore. Normal air dry starch contains about sixteen per cent. of water and about eighty-four per cent. of real starch, and it is my aim to leave my starch in a normal air-dry state, when put in to the boxes for commerce. Hence I allow a slight excess of water during pressing, to allow for evaporation. At ordinary temperatures, if wet starch be subjected to sufficient pressure, nearly all of its water above the "air-dry" standard may be pressed out, but the starch, although dry, remains in an incoherent mass or powder. Likewise "air-dry" starch under pressure will not produce coherent "lumps" at ordinary temperatures; but I have found that if air dry starch, or starch containing a slight excess of moisture, be heated to from 100° to 160° Fahrenheit, and subjected to pressure it will cohere in masses of greater or less firmness according to degree of temperature and pressure. If pressed at 100° Fahrenheit the "lumps" are comparatively soft, but if pressed at upward of 140° Fahrenheit the "lumps" are firm, compact and durable. Above 160° Fahrenheit the starch is in danger of gelatinization or "cooking." The starch produced by my joint application of heat at 140° Fahrenheit, and pressure of say five hundred pounds per square inch for five minutes, is indistinguishable from that produced by the old method of long drying, in appearance and properties, and the "lumps" possess the advantage of retaining any given shape. Beside I am enabled to take starch already dried, of any form, and by my process turn it in a short time into "lump" starch.

"Lump" starch being the highest priced starch entering commerce in large quantities the advantages of my process in this way are easily seen.

I do not limit myself to the production of starch in coherent masses from cereal grains alone, but include all starch containing substances or even other forms of starch itself as sources of my raw material.

Having fully described my invention, what I claim, and desire to secure by Letters Patent, is—

1. The process of manufacturing coherent masses of starch consisting in the application of pressure to starch containing not more than thirty per cent. nor less than sixteen per cent. of water, and subjected to a temperature in excess of 100° and less than 160° Fahrenheit conjointly with pressure, substantially as described.

2. The process of manufacturing coherent masses of starch, consisting in reducing the moisture in the starch until approximately only twenty per cent. of water remains, then subjecting the mass to a temperature of approximately 140° Fahrenheit conjointly with pressure.

In testimony whereof I affix my signature in presence of two witnesses.

ANSIL MOFFATT.

Witnesses:
JOHN T. LECKLIDER,
ROBERT DOUGLASS.